United States Patent [19]

Van Scoy

[11] 4,380,936

[45] Apr. 26, 1983

[54] TUBE MOUNTING FOR ORIFICE METER

[75] Inventor: Davis A. Van Scoy, Simonton, Tex.

[73] Assignee: Grove Valve and Regulator Company, Oakland, Calif.

[21] Appl. No.: 271,638

[22] Filed: Jun. 8, 1981

[51] Int. Cl.³ .............................................. G01F 1/42
[52] U.S. Cl. ................................ 73/861.62; 73/861.61
[58] Field of Search ............ 73/861.61, 861.62, 432 B, 73/86

[56] References Cited

U.S. PATENT DOCUMENTS

| | | | |
|---|---|---|---|
| 2,217,643 | 10/1940 | Rude | 73/861.62 |
| 3,037,384 | 6/1962 | Good | 73/861.62 |
| 3,079,796 | 3/1963 | Freudenthal et al. | 73/861.62 |
| 3,779,076 | 12/1973 | Akeley | 73/861.61 |
| 4,343,193 | 8/1982 | Dawson et al. | 73/861.61 |

Primary Examiner—Howard A. Birmiel
Attorney, Agent, or Firm—Melvin R. Stidham

[57] ABSTRACT

An orifice meter with a pair of parallel, flat steel body plates. Flow tubes of predetermined sizes are welded in mounting rings to be bolted to the opposing body plates with the inner ends of the tube extending into the body space in alignment with the orifice disc. Wide grooves around the tubes ensure communication of pressure tap ports through the tube with lateral pressure tap ducts through the body plates. Ducts through the upstream body plate from the groove to the body space and through the downstream plate from the body space to the exterior, enable one, by removal of a plug, to flush the bottom of the body space with upstream pressure.

5 Claims, 2 Drawing Figures

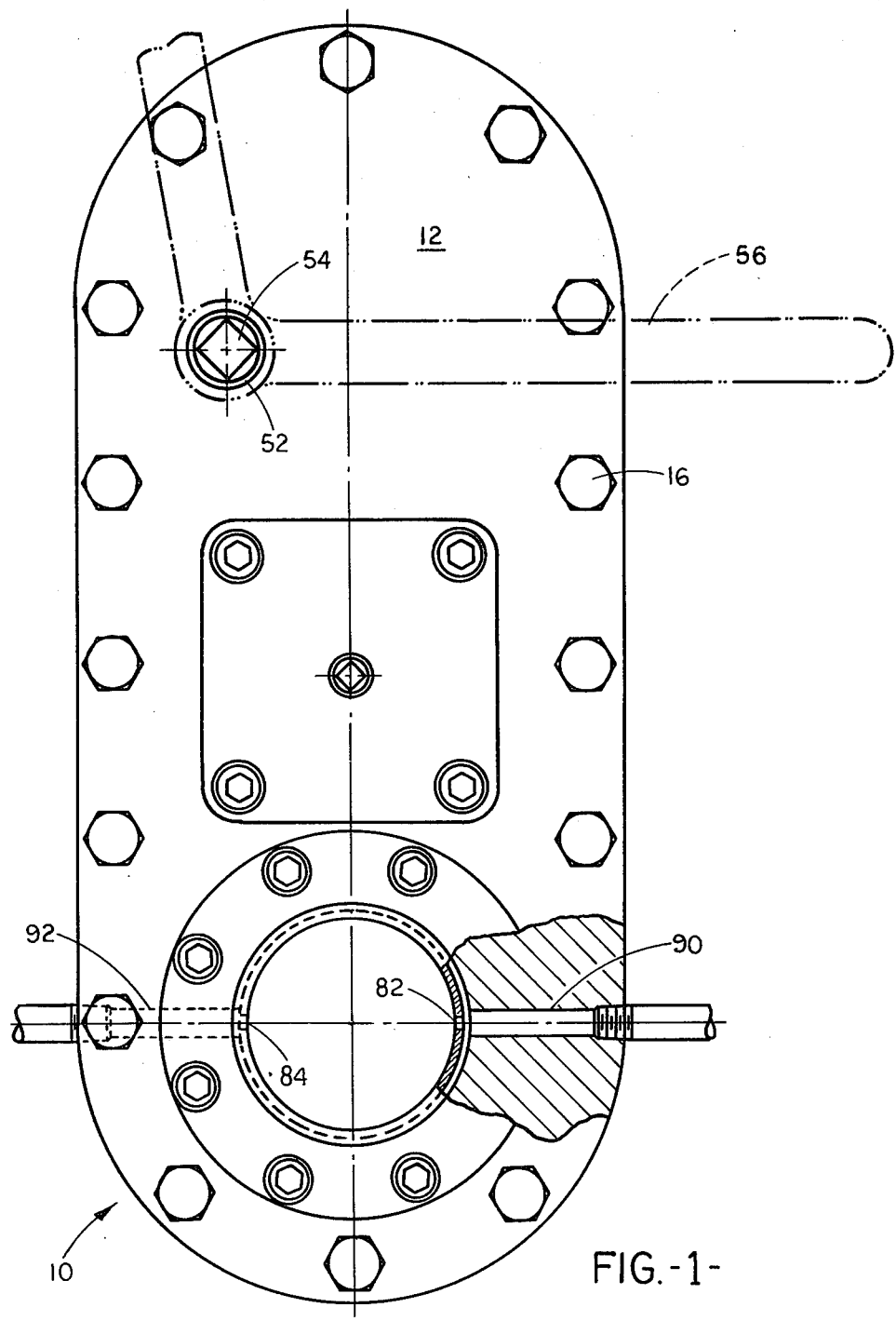
FIG.-1-

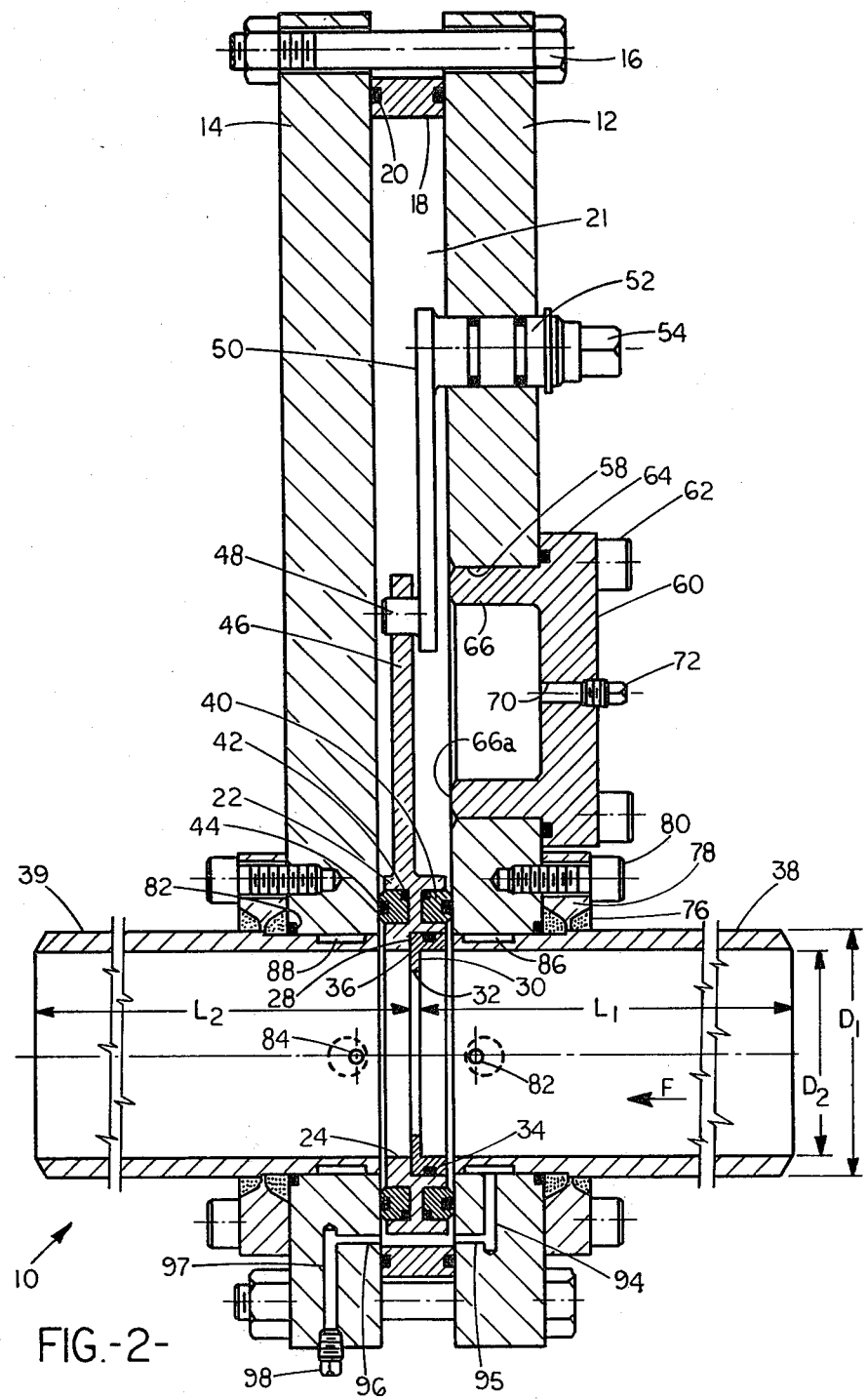
FIG.-2-

TUBE MOUNTING FOR ORIFICE METER

BACKGROUND OF THE INVENTION

Natural gas is generally sold by volumetric measurement, and one way to measure the flowing gas is by passing it thorugh an orifice of a fixed, predetermined size in order to measure the pressure drop across the orifice. An orifice meter or fitting comprises a housing with flow passages in which a disc with an orifice is supported. The housing, which is installed in a gas pipeline, is provided with pressure taps for measuring pressures immediately upstream and immediately downstream of the orifice. Because the orifice plate is subject to wear by impacting of sand, line scale and other foreign particles in the flowing stream, it must be replaced at frequent intervals to insure accuracy in measurement.

Existing orifice fittings generally have housings of the gate valve type containing a carrier plate in which the orifice is secured. The valve body hubs have an outer diameter substantially equal to that of the pipeline but, for any given norminal pipeline diameter there may be two or more inner diameters required, depending upon a number of factors which must be considered in gas metering. This generally requires a manufacturer to stock orifice meters without finishing the flow tubes, and then to complete the tubes to prescribed internal diameter and length upon receipt of a customer's order.

OBJECTS OF THE INVENTION

It is an object of this invention to provide an orifice fitting which may be manufactured and subsequently fitted with flow tubes of a selected internal diameter.

It is a further object of this invention to provide an orifice meter with selected flow tubes having lateral ports which are adapted for alignment with body pressure taps.

Other objects and advantages of this invention will become apparent from the description to follow, particularly when read in conjunction with the accompanying drawings.

SUMMARY OF THE INVENTION

In carrying out this invention, there is provided a gate valve-type body having a pair of parallel plates which are clamped against a body band to form a sealed enclosure. An annular gate-type orifice disc carrier is slidable between the body plates while seal rings on both sides of the carrier maintain sealing engagement with the body plates. The carrier is moved between an active position in alignment with the flow tubes and a replacement position wherein it is aligned with a normally closed disc replacement opening. Flow tubes of selected sizes are welded into mounting rings so that flow tubes of a selected internal diameter and length may be bolted to the body plates, with an O-ring or the like providing a seal therewith. A groove around the tube ensures communication with the valve body pressure taps. A first duct in the upstream body plate open at one end to the groove around the tube and at the other end to the bottom of the body space. A second flow duct opens from the bottom of the valve body space to the atmosphere so that when the first and second ducts are open, the bottom of the valve is flushed of dirt and other foreign matter by upstream pressure.

BRIEF DESCRIPTION OF THE DRAWINGS

FIG. 1 is an elevation view of an orifice fitting embodying features of this invention; and FIG. 2 is a vertical section view of the orifice fitting with the orifice in active position.

DESCRIPTION OF A PREFERRED EMBODIMENT

Referring now to FIG. 1 and 2 with greater particularity, the orifice meter or fitting 10 of this invention comprises a pair of parallel, steel body plates 12 and 14, which are secured together by a plurality of bolts 16 clamping them against the edges of an oval body band 18 carrying resilient seal rings 20 to form a sealed enclosure 21 between the body plates 12 and 14. This is similar to the gate valve structure shown in M. H. Grove U.S. Pat. No. 3,069,129.

Slidably carried between the parallel plates 12 and 14 is a gate-like carrier 22, though of annular configuration with an opening 24 therethrough and counterbored at 26 to form an internal shoulder 28. Supported against the internal shoulder 28 is the orifice disc 30 having an orifice 32 therethrough of a predetermined size. An annular axial flange 34 on the orifice disc 30 carries a seal ring 36 to prevent the occurence of a leak path around the orifice disc 30. As shown, the internal diameter of the axial flange 34, as well as the internal diameter of the carrier opening 24, are substantially equal to the internal diameter of the upstream and downstream flow hubs 38 and 39.

Carried on each side of the annular carrier 22 is a seat ring 40 carrying a resilient outer seal 42 and a resilient main seal 44. The main seals 44 on opposite sides of the carrier 22 maintain constant sealing engagement with the valve plates 12 and 14 so that, in any position thereof, the portion of the orifice carrier 22 radially inside of the main seal rings 44 is in the sealed isolation from the remainder of the valve body space 21.

The orifice carrier 22 has a panhandle stem 46 which is pivoted at 48 to a crank arm 50 carried on a sealed, rotatable shaft 52 with a squared end 54 for partial rotation, as by means of a suitable wrench 56 (FIG. 1).

Displaced from the flow passageway 38 is an orifice disc replacement opening 58, which is of a diameter larger than the outer diameter of the orifice disc 30, but smaller than the diameter of the seat rings 40. This disc replacement opening 58 is normally closed by a closure plate 60 which is bolted at 62 and sealed at 64 to the valve body plate 12. Carried on the closure plate 60 is an inwardly extending annular or circular plug 66, having an inner, orifice disc retaining surface 66a. In the closure plate 60 is a vent port 70 which is normally closed by a threaded plug 72.

In operation, with the orifice carrier in the position shown in FIG. 2 with the orifice disc 30 disposed coaxially with the flow tubes 38 and 39, the disc 30 is held in position by engagement of the edge of the annular flange 34 with the inner edge 38 of the upstream flow tube 38 and also by the force of the gas flowing in the direction of arrow F pressing it against the internal shoulder 28. Then, as the crank arm 50 is pivoted, to move the carrier 22 upward, the orifice disc is held in place by sliding engagement of its annular flange 34 with the planar inner surface of the body plate 12, and it is held in position as it traverses the replacement opening 58 by reason of engagement with the inner surface 66a of the plug 66.

With the orifice carrier 22 in the position shown in FIG. 3 opposing the opening 58, the opening 58 is sealed off from the remainder of the body space 21 by reason of continued sealed engagement of the seal rings 44 with the parallel body plates 12 and 14. Then, the vent plug 72 may be removed to vent just that space within the main seal rings 44 and, thereafter, the cap screws 62 are threaded out for removal of the closure plate 60. In this condition, the orifice disc 30 is fully accessible and the operator may simply reach in, remove it and replace it, with no screws or other attaching means to be unthreaded or threaded. When the plug 60 is replaced, the orifice disc 30 is again held in place without screws or other attaching means.

The flow tubes 38 and 39 generally have an outer diameter $D_1$, equal to the O.D. of the pipeline (not shown), but the inner diameter $D_2$ may vary, depending on several factors, such is required wall thickness, prescribed ratio of orifice diameter to flow tube diameter, and the like. Then, for each flow tube diameter there is a prescribed flow tube length. Typically, the upstream flow tube 38 must be twenty diameters in lenght $L_1$, measured from the orifice disc and the downstream flow tube must be 10 diameters in length $L_2$.

Accordingly, it is an advantage to fabricate the flow tubes separately from the remainder of the orifice meter 10 and to then install them on customer order. Accordingly, the flow tubes 38 and 39 are welded at 76 to mounting rings 78 which may be bolted and sealed 80, 82 to the body plates 12 and 14.

The flow tubes 38 and 39 are provided with small lateral pressure tap ports 82 and 84, each of which is displaced a precise distance, usually one inch, from the orifice plate. Groove 86 and 88 around the flow tubes 38 and 39 embracing the pressure tap ports 82 and 84, ensure communication with pressure ducts 90 and 92 in the body plates 12 and 14. This allows the body tap ducts 90 and 92 to be spaced from the inner wall of the body plates 12 and 14.

Also provided in the upstream body plate 12 are communicating ducts 94, 95 which open into the body space 21 at the bottom thereof, and in the downstream body plate 14 are communicating ducts 96, 97 which open to the outside of the valve body 10, being normally closed by a plug 98. Hence, in the event that there is any accumulation of sand, line scale and other foreign particles below the carrier the plug 98 may be removed to blow the area out with upstream pressure to ensure that the foreign particles will not interfer with proper alignment of the orifice disc.

While this invention has been described in conjunction with a preferred embodiment thereof, it is obvious that modifications and changes therein may be made by those skilled in the art without departing from the spirit and scope of this invention, as defined by the claims appended hereto.

What is claimed as invention is:

1. An orifice meter comprising:
    a housing with a pair of opposing body plates having aligned circular openings therethrough; and
    an orifice plate positioned in said housing in alignment with said openings;
    characterized in that it includes:
    an upstream flow tube of standard pipeline outer diameter and a selected inner diameter;
    a mounting plate welded around said upstream flow tube closely spaced from one end thereof;
    bolt means securing said mounting plate to one of said body plates with said one end of said flow tube extending into the circular openings therein;
    means for sealing between said upstream flow tube and said one body plate;
    means forming a tap port through said upstream flow tube at a predetermined distance from said orifice plate;
    pressure tap ducts bored laterally through said one body plate; and
    an enlarged recess in the outer wall of said flow tube including said tap port to ensure communication with said pressure tap duct.

2. The orifice meter defined by claim 1 further characterized in that:
    said enlarged recess is a wide groove around said flow tube.

3. The orifice meter defined by claim 2 further characterized in that it includes:
    a first flush duct in said one body plate extending from said wide groove to the bottom of the body space between said body plates;
    a second flush duct in the other body plate extending from said bottom of the body space to the exterior thereof; and
    a plug normally closing said second flush duct.

4. The orifice meter defined by claim 1 further characterized in that it includes:
    a downstream flow tube of said selected inner diameter;
    a downstream mounting plate welded around said downstream flow tube closely spaced from one end thereof;
    bolt means securing said downstream mounting plate to the other of said body plates with said one end thereof extending into the circular opening therein; and
    means for sealing between said downstream flow tube and said other body plate.

5. The orifice meter defined by claim 4 further characterized in that it includes:
    tap ports through said flow tubes at predetermined, equal distances from said orifice plate;
    pressure tap ducts bored laterally through said body plates from the exterior to said circular openings; and
    enlarged grooves around the outer walls of said body a tubes embracing said tap ports to ensure communication with said tap ducts.

* * * * *